United States Patent [19]
Hoffmeister

[11] 4,087,502
[45] May 2, 1978

[54] METHOD OF MAKING A COLLAPSIBLE FOAM MANDREL

[75] Inventor: Alfred C. Hoffmeister, Azusa, Calif.

[73] Assignee: TRE Corporation, Beverly Hills, Calif.

[21] Appl. No.: 721,159

[22] Filed: Sep. 7, 1976

Related U.S. Application Data

[62] Division of Ser. No. 561,176, Mar. 24, 1976, Pat. No. 3,988,103.

[51] Int. Cl.² .................. B29D 3/00; B29D 27/04
[52] U.S. Cl. ............................... 264/46.4; 264/46.7; 264/225; 264/236; 264/278; 264/279; 264/313; 264/334; 264/259
[58] Field of Search ............ 264/46.4, 46.7, 45.1, 264/271, 275, 278, 219, 225, 279, 313, 334, 236; 249/63, 64, 150, 152, 153, 122, 124, 127, 178, 179, 180, 183, 184, 185; 425/DIG. 14, DIG. 44, 438, 440, 441, 403, 468, 470, 471

[56] References Cited

U.S. PATENT DOCUMENTS

| | | | |
|---|---|---|---|
| 2,582,022 | 1/1952 | Feldman et al. | 249/160 |
| 3,396,923 | 8/1968 | Windecker | 264/46.7 |
| 3,446,692 | 5/1969 | Turnbull | 264/46.7 |

*Primary Examiner*—Willard E. Hoag

*Attorney, Agent, or Firm*—Blakely, Sokoloff, Taylor & Zafman

[57] ABSTRACT

Method of making a cylindrically shaped, partially collapsible, foam mandrel to be used for the manufacture of hollow resin impregnated fiber tubes. The mandrel is made of a substantially rigid foam cylindrical member, an extractable bar, and a means for aiding in collapsing the cylindrical member such as a groove. Both the extraction bar and the means for aiding in collapsing the cylindrical member are disposed in and along the entire length of the cylindrical member such that the longitudinal axis of the bar, the means for collapsing the cylindrical member, and the axis of the cylindrical member preferably lie on the same plane.

The method of manufacturing the aforementioned mandrel comprises the steps of first providing a circular mold having upper and lower sections. A groove-forming member is placed in the lower section and the extraction bar is placed on the upper section. Foam forming material is poured into the lower section which is then covered with the upper section. Because the foam forming material expands, a generally cylindrical member is formed with the extraction bar and the groove forming member disposed therein. Finally, the cylindrical member is allowed to cure whereby a partially collapsible, foam mandrel is produced.

6 Claims, 17 Drawing Figures

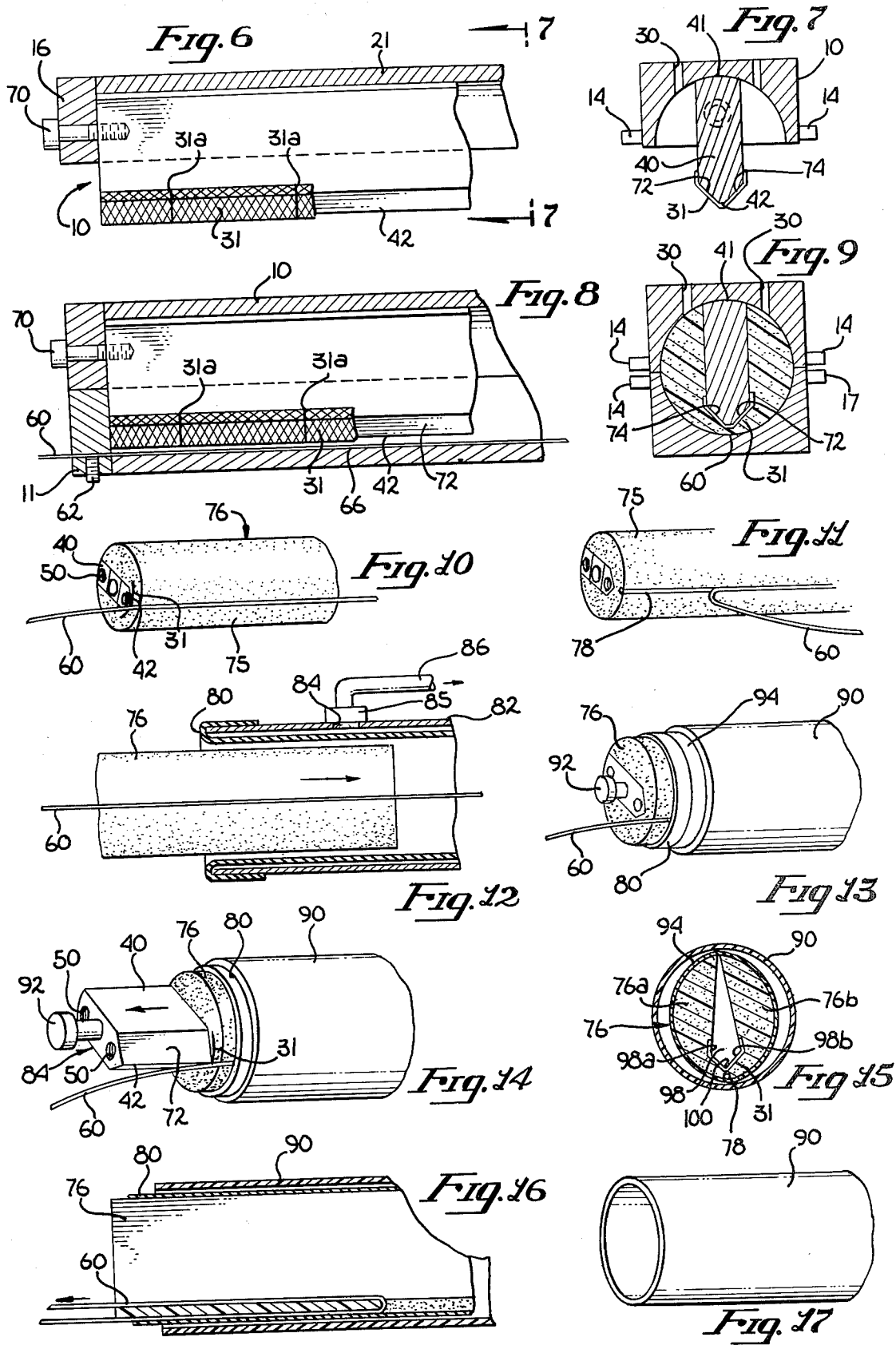

METHOD OF MAKING A COLLAPSIBLE FOAM MANDREL

This is a division of application Ser. No. 561,176, filed Mar. 24, 1976, now U.S. Pat. No. 3,988,103.

BACKGROUND OF THE INVENTION

1. Field of the Invention

The present invention relates to the field of mandrels used in the production of hollow tubes, and more specifically, to a partially collapsible foam mandrel and method for making same.

2. Prior Art

The use of tubular fiber-reinforced resin composites is well known in the art. Such tubular composites have found special utility in the area of components in the manufacture of helicopter blades. Such blades require extremely long, hollow tubes of very accurate dimensions and which are strong, yet substantially rigid. Because of the length involved and the high degree of accuracy required, the prior art methods of manufacturing such tubes have suffered from the disadvantage of being either expensive or not being capable of producing accurate tubes of this length. One prior art method for manufacturing short sections of tubular resin composites is to apply various piles or wrappings of resin impregnated fibers to a rigid cylindrical aluminum mandrel. The resin is allowed to cure and the aluminum mandrel must now be removed. If the tubular composite is relatively short, there is generally no difficulty in sliding the composite structure off the mandrel. However, one can easily see that when the composite to be formed has a long length, for example, in excess of 20 feet, it would be no simple task to withdraw the aluminum mandrel as the friction between the mandrel and the resin composite would be extremely great. Moreover, the use of the aluminum mandrel requires the fibers to be "wet wrapped", that is, the fibers are just wrapped on the mandrel and then a resin applied to the fibers. This process is messy and there is no way to achieve a uniform amount of resin on all of the fibers.

Various concepts have been proposed to manufacture relatively long tubular composites. For example, one could attempt to apply resin impregnated fibers to an inflatable, semi-rigid tube as a hose made of a butyrate material and the like. After the resin has cured, the semi-rigid tube could be deflated and removed leaving the tubular composite. The problem with this method however, is that the flexibility of the tube does not permit the requisite accuracy as the wrappings of fibers, when laid upon the semi-rigid tube, would have a tendency to compress the tube in various degrees and in various locations as the fibers are wrapped under tension. Moreover, a flexible tube 20 feet long would not have the necessary uniformity in diameter necessary for the manufacture of fiber tubular composites for the air craft industry.

Thus, the prior art methods, while they may be adequate for preparation of short sections of tubular composites, are completely useless when applied to the manufacture of relatively long members. The present invention represents an advancement in the art of mandrels and the manufacture of tubular composites, and contains none of the aforementioned shortcomings associated with the prior art production methods. The present invention provides a partially collapsible mandrel which permits the resin impregnated fibers to be applied thereto and then helically removed therefrom leaving a hollow tube of fibers and impregnated resin.

BRIEF SUMMARY OF THE INVENTION

The present invention relates to mandrels used in the production of tubular fiber-reinforced resin composites and a method for making such composites. The mandrel is able to overcome the aforementioned shortcomings of the prior art because it is made such that after the resin impregnated fibers are wrapped thereabout, it is partially collapsible along its length. However, while the fibers are being applied to the mandrel, the mandrel is substantially rigid, which permits very close tolerances. Moreover, because the mandrel is manufactured from a rigid foam material, it is lightweight, may be manufactured with very close tolerances, and is durable. In addition, the mandrel is reuseable which can lower the costs presently associated with manufacture of long tubular composites.

The mandrel comprises a substantially cylindrical member generally made of a rigid foam material which has an extraction bar disposed therein. The extraction bar extends along the entire length of the mandrel and into the mandrel a predetermined distance. When the bar is removed from the mandrel, the mandrel is rendered partially collapsible along the length thereof by the space created by the removed bar. To aid in its removal, the bar is tapered in two dimensions as more fully discussed hereinafter. There is also disposed on the mandrel, separate and distinct from the extraction bar, a groove. The groove is for aiding in collapsing the cylindrical member by increasing the member's circumferential flexibility.

In the manufacture of the aforementioned solid mandrel, a mold having an upper and lower section with a generally circular cross-section is used. A groove-forming member is placed in the lower section of the mold such that it is in intimate contact with the bottom thereof. The extraction bar is secured to the upper section of the mold such that at least one surface of the extraction bar runs along the entire length of the top of the upper mold section. A flexible hinge member, such as wire screen may be secured along the length of the bar on the surface which is exposed over the groove forming member. Next, a foam forming material is poured into the lower section, the top section and the lower section are secured together, and the foam forming material is allowed to expand into the upper section to form the substantially rigid foam cylindrially shaped member. As the foam expands and completely fills the upper and lower sections, the extraction bar, the hinge and groove-forming member are completely secured in the foam. The foam is allowed to cure thus forming the completed mandrel. The mandrel is now ready to be used in the production of resin impregnated tubular composites of glass fibers and the like.

One advantage of using foam to form the mandrel is that its diameter can be decreased easily by applying Teflon tape and the like to the inside of the mold thereby reducing the space into which the foam expands. The diameter can also be easily increased by applying a rubber jacket over the mandrel after it is formed. The rubber jacket is placed on the mandrel in the following manner. After the mandrel is lightly sanded, the rubber jacket is placed inside of an aluminum tube larger than the diameter of the mandrel and sealed off at both ends wound stretching the rubber over the outside diameter of the aluminum tube. A vacuum is then drawn between the inside diameter of the tube and the outside diameter of the rubber jacket thereby causing the rubber jacket to expand against the inside of the tube. The mandrel can now be easily inserted into the rubber jacket. The vacuum is released and the rubber tightly positions itself on the mandrel. The rubber jacket is then covered with a barrier film either bondable or non-bondable to the resin impregnated fibers. The fibers are then wrapped under a predetermined tension onto the mandrel to form an uncured tubular composite.

In one embodiment, the groove-forming member which is embedded in the foam skin i.e., along the length of the outer periphery of the cylindrical member, is stripped away before the mandrel is coated with fibers thus forming the requisite groove along the length of the mandrel. This is done for the purpose of relieving the skin tension of the foam for partial collapse when the extraction bar is later removed. In another embodiment, the groove-forming member can be left intact and removed later so as to completely shear the mandrel into two separate sections after the extraction bar is removed. In this latter embodiment, the hinge member would not be embedded in the foam.

One of the most important advantages and a point of novelty of this invention is that the tightly would fiber wrap on the mandrel may be easily removed without distortion to the tubular composite. This is accomplished by first removing the aluminum extraction bar. Inasmuch as the aluminum extraction bar is tapered in at least two dimensions, once the bar is moved slightly out of one end of the mandrel, the remaining length of the bar is easily removable. Since the mandrel can be partially weakened by previous removal of the groove-forming member, removal of the bar causes the mandrel to collapse along its length thus reducing the diameter and allowing the tubular composite to be removed. Because the mandrel is partially collapsible, yet rigid, very accurate sizing is permissable. Moreover, substantially longer tubes of uniform thickness may be produced. Finally, the mandrel may be reusable thus substantially lowering the cost of the final product.

The novel features which are believed to be characteristic of the invention both as to its organization and method of operation, together with further objectives and advantages thereof, will be better understood from the following description considered in connection with the accompanying drawings in which a presently preferred embodiment of the invention is illustrated by way of example. It is to be expressly understood, however, that the drawings are for the purpose of illustration and description only, and are not intended as a definition of the limits of the invention.

BRIEF DESCRIPTION OF THE DRAWINGS.

FIG. 6 shows a cut-away front view of the upper mold section showing the extraction bar disposed therein;

FIG. 7 is a cut-away side view of FIG. 6, taken along lines 7—7 and showing the positioning of the extraction bar in the upper mold section and the vent holes which allow for the expansion of the foam material;

FIG. 8 is a cut-away front view of the upper and lower mold sections showing the wire running along the lower mold section and the positioning of the extraction bar in the upper mold section relative to the wire;

FIG. 9 is a side view showing the positioning of the extraction bar, the wire, and the shape of the foam material as it surrounds each of the aforementioned components.

FIG. 10 is a partial perspective view of the mandrel after it has been removed from the mold showing the extraction bar and the wire secured in the foam;

FIG. 11 is a partial perspective view of the mandrel showing the groove left in the foam member after the wire is partially freed from the foam;

FIG. 12 is a cut-away front view of the aluminum tube used to apply the rubber jacket on the mandrel;

FIG. 13 is a perspective view showing the foam mandrel, the rubber jacket, a film disposed on the rubber jacket and the resin impregnated fiber glass wrapping;

FIG. 14 is a perspective view showing how the extraction bar is removed from one end of the mandrel leaving the foam member, the rubber jacket, and the fiber glass wrapping intact.

FIG. 15 is a front view of the tubular composite showing how the foam mandrel has collapsed therein along its length;

FIG. 16 is a side view of the final tubular composite showing how the wire may be extended back through the member and pulled along the bottom thereof shearing the foam member into two segments;

FIG. 17 is a perspective view of the now cured tubular fiber-reinforced resin composite.

DETAILED DESCRIPTION OF THE INVENTION

Figure 1:
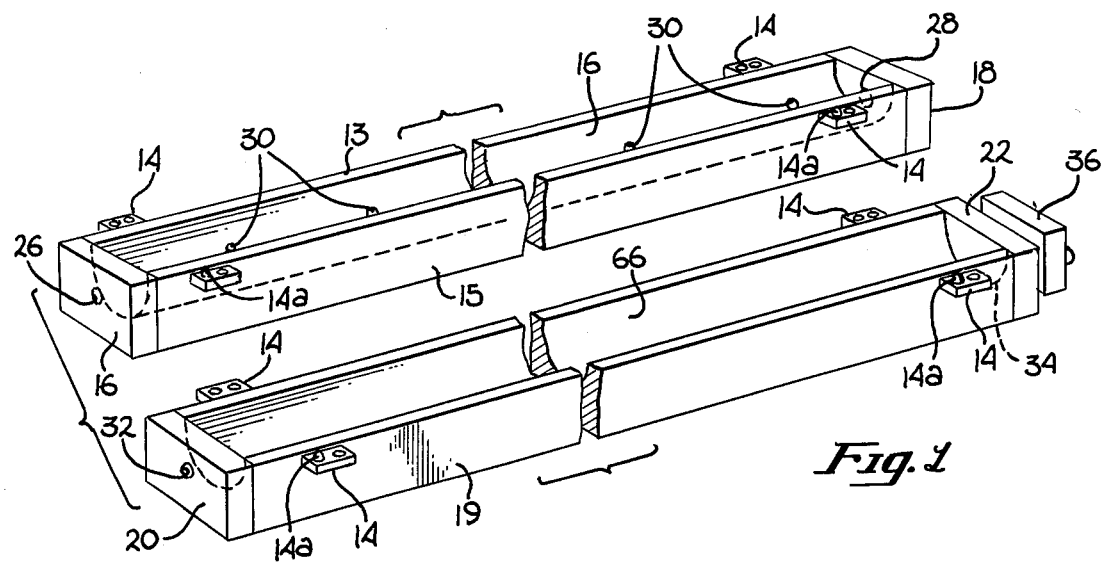
FIG. 1 is a perspective view of the upper and lower sections of the mandrel mold.

Referring first to FIG. 1, there is shown the upper and lower sections 10 and 11 of the mandrel mold. The sections, when joined together, produce a mold having a generally circular cross-section. The upper mold 10 has ends 16 and 18 and sides 13 and 15, arranged and configured in a general rectangular shape. The lower mold section 11 has ends 20 and 22, and sides 17 and 19 also arranged and configured in a general rectangular shape. Each of the mold sections has attaching members 14 which have aligning protuberances 14a. These types of attaching members are well known in the art and are used to position and to attach the upper mold section 10 to the lower mold section 11. Various vent holes 30 are disposed completely through the upper mold section 10 such that the arcuous inside area 16 is in contact with the outside. As more fully discussed hereinafter, these vent holes allow expansion of a foam forming material to completely fill the upper and lower mold sections. The upper mold section 10 also has extraction bar holes 26 and 28 to position an extraction bar along the length thereof such that the extraction bar runs along the entire length of the top of the upper section 10.

The lower mold section 11 has wire holes 32 and 34 disposed in ends 20 and 22. These holes enable a wire to be inserted at one end and run along the entire length of the lower mold 11 along the bottom 66 thereof. A tension block 36 disposed on end 22 places tension on the aforementioned wire and ensures that the wire runs directly along the bottom 66 of the lower mold 11.

Figure 4:
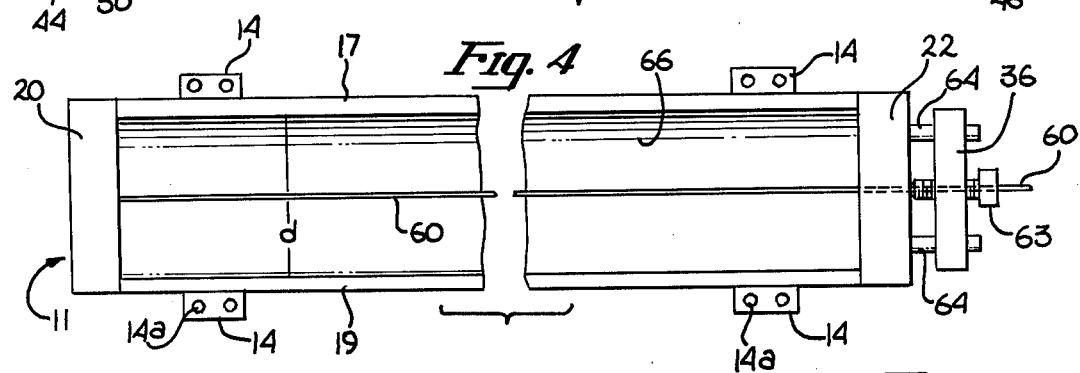
FIG. 4 is a top view of the lower mold section showing the groove-forming wire disposed along the bottom thereof.
Figure 5:
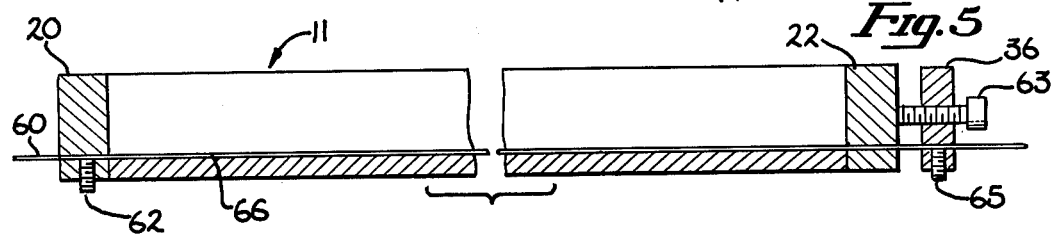
FIG. 5 is a cut-away front view of the lower mold section showing the wire running along the bottom thereof and disposed between two wire stops 62 and 64.

Shown in FIGS. 4 and 5 is the lower mold section 11. The lower mold section has a diameter $d$ which may be of any desired diameter. Located at end 22 is the tension block 36. Tension block 36 is disposed to end 22 by support means 64. As tension knob 63 is rotated in one direction, the block 36 is caused to be disposed away from end 22. Inasmuch as wire 60 is secured in the tension block by means of wire stop 65, the wire 60 is drawn outwardly from the end 22. At the opposite end 20, the wire 60 is also secured thereto by means of wire stop 62. Thus, the wire is secured between wire stops 62 located in end 20 and stop 65 located in tension block 36. By rotating tension knob 63 the wire is drawn snugly against the bottom 66 of the lower mold section 11. In the presently preferred embodiment, the wire 60 has a dimension of 0.026 inches and is used to form a groove along the bottom of the foam mandrel. Other means may also be disposed along bottom 66 which form a groove in the foam mandrel.

Shown in FIGS. 6, 7, and 8 is the upper mold section 10. The upper mold section 10 has the extraction bar 40 disposed therein by means of extraction bar bolts 70 such that the length of the bar 40 abuts against the top 21 of the upper section 10. FIGS. 6, 7 and 8 also point out the use of a wire hinge member 31 attached to the bottom or apex 42 of bar 40 at approximate 4 inch intervals by wire attaching means 31a. Hinge member 31 is another point of novelty of the present invention and enables the mandrel to be rendered flexible along its length without damage as discussed in more detail hereinafter.

Figure 2:
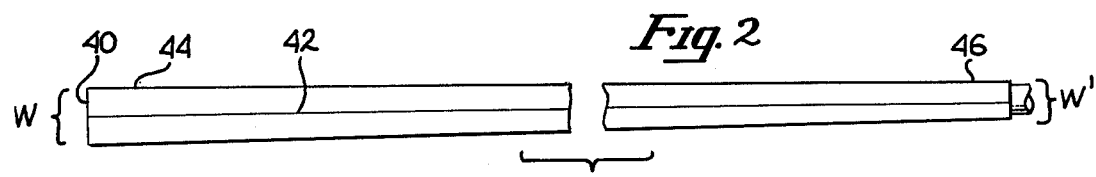
FIG. 2 is a top view of the extraction bar showing the tapering of the width of the bar along its length.
Figure 3:
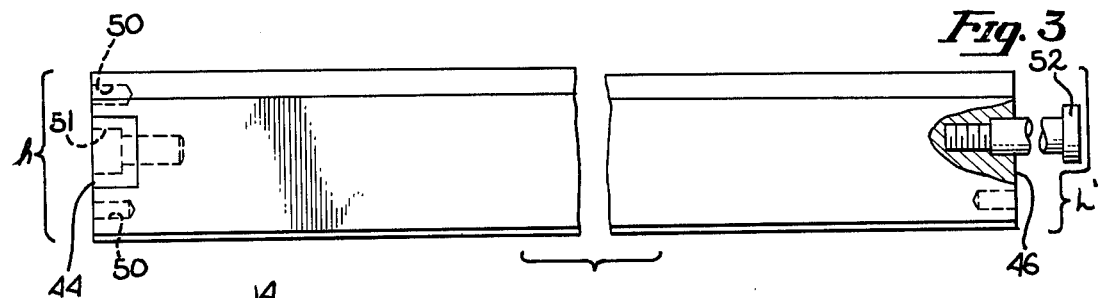
FIG. 3 is a front view of the extraction bar showing the tapering of the height of the bar along its length.

The extraction bar 40 also represents a point of novelty and a distinct advancement over the prior art. This bar 40 is clearly shown in FIGS. 2 and 3. The bar is a substantially rigid metal bar usually made of a lightweight metal such as aluminum and the like. It is tapered from an initial width $w$ at the large end 44 to a narrower width $w'$ at the narrow end 46. The bar 40 is tapered in the width dimension along its length at a rate of approximately 0.010 inches per foot. The extraction bar is also shown as having a large height $h$ at large end 44 and a smaller height $h'$ at the narrow end 46. The extraction bar is tapered in height dimension along the length of the bar at approximately the same rate per foot as the width taper. It is understood that other tapering rates are within the scope of the invention. The bar 40 is tapered in its height and width dimensions along the length thereof to aid in the removal of the bar from the completed foam mandrel (FIG. 10), which permits the mandrel to partially collapse along the length thereof (FIG. 10). The bar 40 also provides the mandrel with needed rigidity and load-supporting qualities.

Various attaching holes 41 are disposed at the large end 44 of the bar 40 which enable the bar to be coupled to a wench and the like when removing the bar from the foam mandrel as hereinafter discussed. Rotation knob holes 51 and associated knobs 52 are also provided on the bar 40 at each end which permit the bar (and the foam mandrel) to be easily rotated.

Seen most clearly in FIG. 7 and 9, the extraction bar 40 is disposed along and concentric with the radius of the upper mold section 10 such that the longitudinal axis of the bar and the upper mold section lie in the same plane. The bar 40 has two angled areas 72 and 74 on the bottom thereof which form a generally V-shaped area. Angle areas 72 and 74 form an apex 42 which runs along the length of the bar 40. The hinge member 31 is coupled to the bar 40 such that it is equally divided on either side of the apex 42 by attaching members 31a. Members 31a may be any well known wire, clip or the like which removably secures the hinge 31 to the apex 42 along the entire length of bar 40. Also seen in these Figures are vent holes 30 which enable the foam to readily expand about the mandrel and to encase it leaving only area 41 of the bar 40 exposed.

In FIGS. 8 and 9, the upper mold 10 has been disposed upon lower mold 11. The extraction bar 40 extends into the lower mold 11 but does not extend or come in contact with the bottom 66 of the lower mold. There is a space of a predetermined distance between the bottom of the extraction bar 40 and the wire 60. One can see most clearly in FIG. 9 that the wire 60 is positioned directly beneath apex 42 and hinge 31 when the upper and lower mold sections 10 and 11 are coupled together by attaching members 14.

In the presently preferred embodiment before the upper mold section is disposed on the lower mold section 11, the lower mold section is filled with a two-component, rigid, close cell polyether urethane foam composition. Such foam compositions are well known in the art and other similar compositions which produce a structure having a density of 1.9 lbs. per cubic foot are within the scope of this invention. As the two-component system begins to form the desired foam structure, excess air is released by vent holes 30 in the upper mold 10. After the foam has cured, the vent holes are opened by means of a drill and the mold is disassembled. The foam mandrel 76 as shown in FIG. 10 is removed from the mold. As is clearly shown in this Figure, the wire 60 and the extraction bar 40 are now part of the mandrel 76 and together with the cylindrical foam member 75 form the completed mandrel. The foam has also expanded about the hinge member 31 so as to securely position the member in the area of the apex 42. The hinge member 31 is secured in the cylindrical member 75 along the length thereof between the bar 40 and the groove member or wire 60.

The mandrel 76 is now prepared for the wrapping of the glass fibers or other similar fibers known in the art about the mandrel by stripping away wire 60 which is embedded in the cylindrical foam member 75, as shown in FIG. 11. The resulting structure produced when the wire 60 is removed is a groove 78 formed in the skin of the mandrel 76. This groove 78 is formed for the purpose of relieving tension on the outer periphery of the mandrel which enables the mandrel to be partially collapsed when the extraction bar is later removed. Groove 78 is a unique aspect of mandrel 76. It permits the cylindrical member 75 to increase its circumferential flexibility such that, after the bar 40 is removed, the mandrel 76 is rendered circumferentially flexible without substantial destruction. While the groove 78 has been disclosed as being formed by removal of a wire 60, other means are also within the scope of this invention. For example, the cylindrical member 75 can be formed without any groove forming member. The groove 78 can then be cut in the mandrel 76 prior to the wrapping step. Thus, any means for aiding in collapsing the cylindrical member 75, such as a wire, a cut groove, etc. disposed on the periphery of the cylindrical member 75 and extending into the member a predetermined distance which aids in collapsing the member along its length by increasing its circumferential flexibility is within the scope of this invention. In this embodiment, the wire 60 is removed prior to wrapping the mandrel 76 with glass fibers. However, as shown in FIGS. 13 and 14, the wire may be left on the mandrel and removed only after the glass fibers are applied.

It has been found that while the wire 60 and the resulting groove 78 do substantially increase the flexibility of the cylindrical member 75, excess flexing can cause the member 75 to shear into two sections. To substantially prevent this, the preferred embodiment utilizes hinge member 31. Member 31, preferably a wire mesh screen material, enables the cylindrical member 75 to circumferentially open and close without the aforementioned problem of shearing into two sections. While the mandrel 76 can be manfactured without the hinge member 31, it has been found that by use of this member, the useful life of the mandrel is significantly increased. Before proceeding to the next step, the mandrel 76 is lightly sanded in and around the groove 75, the vent hole areas and the exterior area where the extraction bar 40 joins the mandrel 76.

As previously discussed the diameter of the mandrel may be made larger or smaler as desired. When it is desired to make the mandrel diameter smaller, the inner surface of the upper and lower mold sections 10 and 11 may be lined with tape, such as Teflon tape and the like, thereby preventing the foam from expanding to the full dimensions of the upper and lower mold sections 10 and 11. When it is desirable to make the diameter of the mandrel larger, a rubber jacket is disposed about the mandrel 76. This is shown in FIG. 12. In this embodiment, a rubber jacket is placed inside of an aluminum tube 82 which has a diameter larger than that of the mandrel 76. The rubber is sealed off by stretching it up over the outside diameter of the aluminum tube 82. A vacuum is applied by withdrawing air out of exit 86 which is coupled to the tube 82 by coupling means 85. The vacuum is drawn between the inside diameter of the tube 82 and outside diameter of the rubber jacket 80 causing the rubber jacket 80 to be drawn against the inside of tube 82. The foam mandrel 76 can now be inserted into the rubber jacket 80. The vacuum is released and the rubber jacket 80 is tightly positioned on the foam mandrel 76. The mandrel 76 and the rubber jacket 80 are now removed from the aluminum tube 82 and may now be coated with a barrier film 94 which may either be bondable or non-bondable to the resin impregnated fiber glass, i.e., adhesive or adhesive-free.

Shown in FIG. 13 is the mandrel 76, the rubber jacket 80 and the barrier film 94 cylindrically covered with resin impregnated fiber glass wrapping 90 is easily applied to the mandrel because the mandrel is rotatable about rotation knobs 92 disposed at each end of the extraction bar 40. The knobs 92 permit the mandrel 76 to be rotated about its longitudinal axis. As the mandrel is being rotated, various coatings and fibers, fiber wrappings, etc., are applied. One reason why the extraction bar 40 is equipped with the rotation knobs 92 is because the wrapping 90 must be accurately disposed on the mandrel 76 at a constant tension in order for the final tubular composite (FIG. 17) to be useful in the manufacture of helicopter blades. If the wrapping 90 is applied unevenly, or if the mandrel must be set upon a surface as an area is covered, the likelihood of undersirable formations in the shape of the tubular composite is greatly increased. In the present invention, it has been found that by wrapping the mandrel 76 with fibers held under tension, increased strength in the jacket. As hereinbefore discussed, the bar 40 is tapered in two directions, which permits the bar to be relatively easily removed from the mandrel 76. This is accomplished by coupling the extraction bar 40 via attaching holes 50 to an electric wench unit. A cable is secured to the extraction bar and begins to pull on the large end 54 of the bar 40. Once the initial load has freed the bar from the foam, the rest of the bar can be easily removed because of the tapering.

The cylindrical member 75, especially if covered with rubber jacket 80, wants to close the space left by the now removed bar 40 so as to achieve a more stable position. To prevent undesired cracks or other irregularities occuring at various locations on the cylindrical member 76 during collapse, groove 78 is formed by removal of wire 60. This enables the cylindrical member to collapse along its length, but in a predetermined manner. Moreover, because hinge member 31 is located above the groove 78, the mandrel is further retarded from shearing into two sections.

In the presently preferred embodiment, the longitudinal axis of each of the bars 40, the groove 78, and the cylindrical member 75 lie on a common plane. This enables the mandrel 76 to be more readily collapsible along its length, and decrease the possiblity of undesired facturing of the mandrel.

Referring now to FIG. 15, one can see that the mandrel 76 has partially collapsed along its length. Groove 78 formed by removal of wire 60 is disposed beneath groove 98 such that the longitudinal axis of both grooves lie in the same plane. The sides of groove 98, 98a, 98b, respectively, are disposed closer together as the mandrel 76 collapses. Inasmuch as groove 78 is disposed at the bottom of the mandrel, sides 76a and 76b flex thereabout without damage to arca 100 which holds the sides 76a and 76b together. Moreover, if the rubber jacket 80 is used, the tension of the jacket on the mandrel 76 increases the ability of the mandrel to collapse thus easily reducing the diameter and allowing the mandrel to be extracted from the composite 90. The barrier film 94 also aids in preventing any possible adhesion between the composite 90, and the mandrel 76. As previously discussed, in the presently preferred embodiment, hinge member 31 is arranged and configured along the length of the bar 40 such that it is embedded in the form directly beneath groove 98 along the length thereof. Because hinge member 31 is preferably a wire screen material, it is sufficiently flexible so as to enable the mandrel 76 to collapse, yet retards possible fracture of the mandrel into separate segements.

After complete removal of the bar 40, and the collapsed mandrel 76, the mandrel 76 may be used again by insertion of the extraction bar into the cylindrical member 75. The procedure as hereinbefore described, would again be repeated with the now reformed mandrel. Thus, the mandrel can be reused a number of times thereby lowering the costs.

In another embodiment, shown in FIG. 16, the wire 60 is not removed from the mandrel 76 until after the bar 40 is removed. In this embodiment, after the extraction bar 40 is removed from the mandrel, the wire 60 which is now disposed between the rubber jacket 80 and the mandrel 76 is set back through the area of the foam which was originally occupied by the extraction bar 40. occupied by the extraction bar 40. In this embodiment, no hinge member is used as this would retard the ability of the wire to be drawn back through the cylindrical member 75. Pulling both ends of the wire forward as shown in FIG. 16 causes the foam mandrel to be sheared in at least two pieces. Again, the pieces may now be easily removed leaving the desired tubular composite 90 shown in FIG. 17. In this embodiment, even though the mandrel 76 has been sheared in half, the mandrel may still be reused. This is accomplished by sanding smooth the mandrel in the area where the wire has cut the mandrel in half and cementing, or otherwise attaching the two halves together. Again, the extraction bar 40 would be inserted into the original area it occupied and the hereinbefore described procedure would be repeated.

The tubular composite 90 shown in FIG. 17 does not have a rigid structure as the resin has not yet cured. It has been found that after removal of the mandrel 76, the composite 90 should be supported by insertion of a positioning fixture into the hollow area of the composite. The positioning fixture is then placed in the desired mold, and removed. Curing conditions such as heat and pressure are applied to the composite while in the mold fixture. This last step is necessary as most resins used to impregnate the fibers require the application of heat for periods of time of about 60 to 90 minutes. Applications of heat for this period of time can degrade the foam mandrel 76, thus, the necessity of removing the mandrel 76 prior to cure. Should the resin not need application of heat in order to properly cure (e.g. polyester type not requiring heat or pressure), the composite 90 can remain on the mandrel 76 until curing is complete and then removed.

As hereinbefore discussed, the tension required during the wrapping step produces a substantially cylindrical shape. To produce other shapes, the mold fixture after the composite 90 has cured, can apply pressure where desired to shape the composite about the positioning fixture. If a cylindrical composite or a composite not having as intricate pattern is desired, the rubber jacket 80 can be used as the positioning fixture. In this embodiment, the jacket 80 acts as a bladder, that is, after the composite 90 has cured, the rubber jacket is reinstated into the composite and filled with air. The air-filled jacket 80 and the composite are placed in the bond fixture and shaped as desired.

It should be understood that while the preferred examples described herein deal with cylindrical shapes, other configurations can be used, using the same principles. Such terms like "circumferential" and "diameter" should be understood to mean the periphery and distance or dimensions or shapes other than cylinders.

It will be apparent to one skilled in the art that other changes and modifications can be made without departing from the spirit or scope of the present invention as defined and claimed herein.

I claim:
1. The method for making a collapsible mandrel, comprising:
  (a) removably securing a flexible hinge reinforcing strip to an elongated bar; and
  (b) securing said elognated bar against a wall defining a cylindrical mold cavity of a plural part mold, so that said bar extending substantially along the length of said cavity and extends transversely substantially across said cavity;
  (c) depositing hardenable foamable material in said mold cavity;
  (d) foaming and curing said foamable material to form a rigid foam member and to secure said bar and said strip in said foam member;
  (e) removing said foam member and said bar from said mold, thereby making a mandrel including said foam member and said bar.

2. The method for making a hollow tube comprising:
  (a) securing an elongated bar against a wall defining a cylindrical mold cavity of a two-part mold, so that the bar extends substantially along the length of said cavity and extends transversely substantially across said cavity;
  (b) depositing hardenable foamable material in said cavity;
  (c) foaming and curing said foamable material to form a rigid foam member and to removally secure said bar in said foam member;
  (d) removing said foam member and said bar from said mold, thereby making a mandrel including said foam member and said bar;
  (e) disposing fibers and hardenable resin about said mandrel;
  (f) curing said resin to form said fibers and said resin into a tube;
  (g) removing said bar from said mandrel and collapsing said foam member to permit removing said foam member from said tube;
  (h) and removing said foam member from said tube, making said hollow tube.

3. The method of claim 2 including positioning a sleeve member about said mandrel prior to said disposing step.

4. The method of claim 2 wherein said mandrel is removed prior to said curing and said mandrel is replaced by a support fixture and thereafter said resin is cured.

5. The method as defined in claim 2 wherein a groove forming member is placed in said lower mold section prior to forming said foam member.

6. The method as defined in claim 5 wherein said foam member is split into at least two sections when said groove-forming member is removed from said mandrel.

* * * * *

UNITED STATES PATENT AND TRADEMARK OFFICE
CERTIFICATE OF CORRECTION

PATENT NO. : 4,087,502

DATED : May 2, 1978

INVENTOR(S) : Alfred C. Hoffmeister

It is certified that error appears in the above-identified patent and that said Letters Patent are hereby corrected as shown below:

IN THE ABSTRACT

Add the following third paragraph:

-- To manufacture the hollow fiber tubes or composites the invented mandrel is wrapped with resin impregnated fibers generally disposed on a tape, or wound in wet form. The extraction bar is removed and the mandrel collapsed along its length. The mandrel is now removed from the hardened fibers leaving a tubular structure of predetermined length. The structure is then circumferentially disposed about a positioning fixture where the resin is cured and any desired shaping is performed. Because the mandrel is not destroyed and is reusable, an inexpensive and simple means of manufacturing long, hollow tubes of resin impregnated fibers is achieved. --

IN THE SPECIFICATION

Column 1, line 16, after the word "components" insert -- used --.

UNITED STATES PATENT AND TRADEMARK OFFICE
CERTIFICATE OF CORRECTION

PATENT NO. : 4,087,502
DATED : May 2, 1978
INVENTOR(S) : Alfred C. Hoffmeister

It is certified that error appears in the above-identified patent and that said Letters Patent are hereby corrected as shown below:

Column 2, line 67, "wound" should be -- by --.

Column 7, line 24, "smaler" should be -- smaller --.

Column 8, line 36, "arca" should be --area--.

Column 8, line 66, delete the words "occupied by the extraction bar 40."

Signed and Sealed this

Fourth Day of September 1979

[SEAL]

Attest:

*Attesting Officer*

LUTRELLE F. PARKER
*Acting Commissioner of Patents and Trademarks*